US012757150B2

(12) United States Patent
Wigard et al.

(10) Patent No.: US 12,757,150 B2
(45) Date of Patent: Oct. 6, 2026

(54) NETWORK-BASED POSITIONING IN A NON-TERRESTRIAL NETWORK

(71) Applicant: Nokia Technologies Oy, Espoo (FI)

(72) Inventors: Jeroen Wigard, Aalborg (DK); Frank Frederiksen, Aalborg (DK); Enric Juan, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 287 days.

(21) Appl. No.: 18/436,224

(22) Filed: Feb. 8, 2024

(65) Prior Publication Data

US 2024/0284380 A1 Aug. 22, 2024

Related U.S. Application Data

(60) Provisional application No. 63/446,688, filed on Feb. 17, 2023.

(51) Int. Cl.
*H04W 64/00* (2009.01)
*H04L 5/00* (2006.01)
*H04W 84/06* (2009.01)

(52) U.S. Cl.
CPC ............. *H04W 64/00* (2013.01); *H04L 5/005* (2013.01); *H04W 84/06* (2013.01)

(58) Field of Classification Search
CPC ..... H04W 64/00; H04W 84/06; H04W 4/023; H04W 4/025; H04L 5/005
See application file for complete search history.

(56) References Cited

U.S. PATENT DOCUMENTS

| | | | | |
|---|---|---|---|---|
| 2022/0272592 | A1* | 8/2022 | Choi | H04W 36/0009 |
| 2024/0291577 | A1* | 8/2024 | Lee | H04B 17/347 |
| 2025/0081142 | A1* | 3/2025 | Hasegawa | G01S 19/34 |

OTHER PUBLICATIONS

"3rd Generation Partnership Project; Technical Specification Group Radio Access Network; LTE Positioning Protocol (LPP (Release 17)", 3GPP TS 37.355, V17.3.0, Dec. 2022, pp. 1-348.
"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.
"Moderator's summary of discussion [94e-24-R18-NR-NTN]", 3GPP TSG-RAN Meeting #98-e, RP-223552, Agenda: 9.3.2.7, Thales, Dec. 12-16, 2022, 93 pages.

(Continued)

*Primary Examiner* — Fred A Casca
(74) *Attorney, Agent, or Firm* — McCarter & English, LLP

(57) ABSTRACT

An approach is provided for network-based positioning in non-terrestrial networks. The approach, for example, involves receiving a downlink position reference signal from a network node of a non-terrestrial network. The approach also involves determining whether the user device is in either line-of-sight or non-line-of-sight with respect to a network node of a non-terrestrial network. The approach further involves performing at least one of: (a) based on determining that the user device is in line-of-sight, transmitting a sounding reference signal for positioning to the network node; and (b) based on determining that the user device is in non-line-of-sight, transmitting the sounding reference signal for positioning to the network node for a number of repetitions.

19 Claims, 12 Drawing Sheets

(56) References Cited

OTHER PUBLICATIONS

"3rd Generation Partnership Project; Technical Specification Group Radio Access Network; Study on requirements and use cases for network verified UE location for Non-Terrestrial-Networks (NTN) in NR (Release 18)", 3GPP TR 38.882, V18.0.0, Jun. 2022, pp. 1-13.

"3rd Generation Partnership Project; Technical Specification Group Radio Access Network; NG Radio Access Network (NG-RAN); Stage 2 functional specification of User Equipment (UE) positioning in NG-RAN (Release 17)", 3GPP TS 38.305, V17.3.0, Dec. 2022, pp. 1-133.

"Solutions for NR to support non-terrestrial networks (NTN)", 3GPP TSG RAN meeting #86, RP-193234, Agenda: 9.1.2, Thales, Dec. 9-13, 2019, 10 pages.

"3rd Generation Partnership Project; Technical Specification Group Radio Access Network; Solutions for NR to support non-terrestrial networks (NTN) (Release 16)", 3GPP TR 38.821, V16.1.0, May 2021, pp. 1-140.

Finnish Application No. 20235140, "Assisted SL-RTT Method Switch", filed on Feb. 13, 2023, pp. 1-46.

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

* cited by examiner

FIG. 2

200

Multi-RTT
Positioningmethod in 5G

- Timing based positioning technique involving both DL and UL signals and measurements.
- It does not suffer from synchronization offset errors.

1. gNBs transmit DL PRS
2. UE transmits SRS for positioning
3. UE measures UE RxTx Time difference per gNB
4. UE reports UE RxTx measurements to LMF
5. Each gNB measures gNB RxTx Time difference
6. gNBs report gNB Rx-Tx measurement to LMF
7. LMF estimates RTT to gNBs
8. LMF estimates UE positioning

- Note: spec supports steps 1 and 2 being reversed

SRSP: Sounding Reference Signal for positioning
PRS: Positioning Reference Signal
LMF: Location Management Function

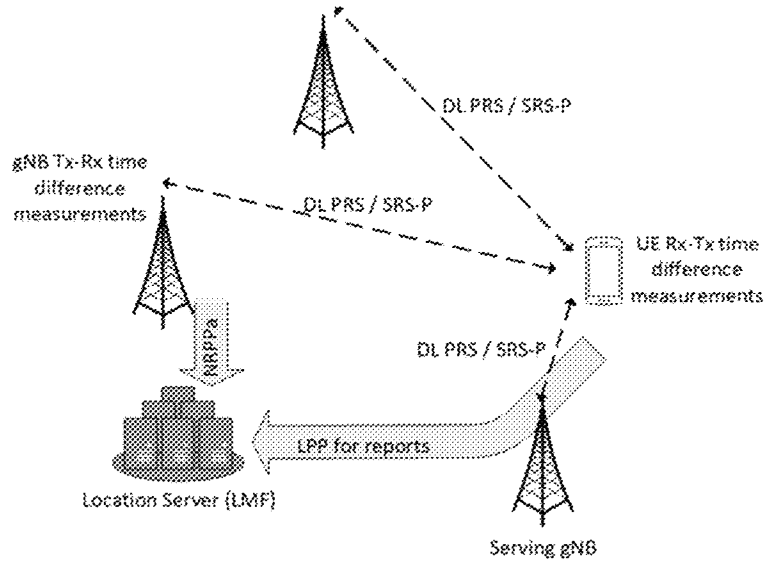

300

```
- - ASN1START

ProvideAssistanceData :: =   SEQUENCE {
    criticalExtensions          CHOICE {
        cl                              CHOICE{
                provideAssistanceData-r9ProvideAssistanceData-r9-IEs ,
                spare3 NULL , spare2 NULL , spare1 NULL
        },
        criticalExtensionsFutureSEQUENCE  { }
    }
}

ProvideAssistanceData-r9-IEs : := SEQUENCE {
        cornmonIEsProvideAssistanceData          CornmonIEsProvideAssistanceData          OPTIONAL , - - Need ON
        a - gnss- ProvideAssistanceData      A- GNSS- ProvideAssistanceData          OPTIONAL , - - Need ON
        otdoa-ProvideAssistanceData              OTDOA-ProvideAssistanceData          OPTIONAL , - - Need ON
        epdu-Provide-Assistance-Data         EPDU-Sequence                           OPTIONAL , - - Need ON
        ...,
        [ [
        sensor-ProvideAssistanceData-r14     Sensor-ProvideAssistanceData-r14        OPTIONAL,  - - Need ON
        tbs-ProvideAssistanceData-r14        TBS-ProvideAssistanceData-r14           OPTIONAL , - - Need ON
        wlan-ProvideAssistanceData-r14       WLAN-ProvideAssistanceData-r14          OPTIONAL,  - - Need ON
        ] ] ,
        [ [  nr - Multi - RTT- ProvideAssistanceData- r16
                                             NR-Multi-RTT-ProvideAssistanceData-r16
                                                                                     OPTIONAL , - - Need ON
           nr-DL-AoD-ProvideAssistanceData-r16
                                             NR- DL-AoD- ProvideAssistanceData- r16  OPTIONAL , - - Need ON
           nr-DL-TDOA-ProvideAssistanceData-r16
                                             NR- DL-TDOA-ProvideAssistanceData- r16
                                                                                     OPTIONAL , - - Need ON
        ] ]
}

- - ASN1STOP
```

301

FIG. 3A

301

```
-- ASN1START

NR- Multi - RTT - ProvideAssistanceData- r16 :: = SEQUENCE {
        nr-DL-PRS-AssistanceData-r16              NR-DL-PRS-AssistanceData-r16          OPTIONAL , - - Need ON
        nr - SelectedDL- PRS - IndexList - r16    NR- SelectedDL- PRS- IndexList - r16  OPTIONAL , - - Need ON
        nr-Multi-RTT-Error-r16                    NR-Multi-RTT-Error-r16                OPTIONAL , - - Need ON
        ...,
        [[
        nr- On-Demand- DL-PRS - Configurations-r17 NR- On- Demand-DL-PRS-Configurations - r17
                                                                                        OPTIONAL , - - Need ON
        nr-On-Demand-DL-PRS-Configurations-Selected-IndexList-r17
                                                  NR-On-Demand-DL-PRS-Configurations-Selected-IndexList-r17
                                                                                        OPTIONAL , - - Need ON
        assistanceDataValidityArea- r17      AreaID-CellList- r17                       OPTIONAL , - - Need ON
        ]]
}

-- ASN1STOP
```

FIG. 3B

320

```
-- ASN1START

NR-DL-PRS-AssistanceData-r16 :: = SEQUENCE {
        nr-DL-PRS-ReferenceInfo-r16          DL-PRS-ID-Info-r16 ,
        nr-DL-PRS-AssistanceDataList-r16     SEQUENCE    (SIZE (1 .. nrMaxFreqLayers-r16)) OF
                                                       NR- DL- PRS- AssistanceDataPerFreq- r16 ,
        nr-SSB-Config-r16                    SEQUENCE (SIZE (1 .. nrMaxTRPs-r16)) OF
                                                       NR- SSB- Config - r16    OPTIONAL ,   - - Need ON
        ...
}

NR-DL-PRS-AssistanceDataPerFreq-r16 :: = SEQUENCE (
        nr-DL-PRS-PositioningFrequencyLayer-r16
                                             NR- DL- PRS- PositioningFrequencyLayer- r16 ,
        nr-DL-PRS-AssistanceDataPerFreq-r16  SEQUENCE (SIZE (1 .. nrMaxTRPsPerFreq-r16)) OF
                                                       NR-DL-PRS-AssistanceDataPerTRP-r16 ,
        ...
}

NR-DL-PRS-AssistanceDataPerTRP-r16 :: = SEQUENCE {
        dl-PRS-ID-r16                        INTEGER (0 . . 255) ,
        nr-PhysCellID-r16                    NR-PhysCellID-r16          OPTIONAL,    - - Need ON
        nr-CellGlobalID-r16                  NCGI-r15                   OPTIONAL,    - - Need ON
        nr- ARFCN- r16                       ARFCN- ValueNR- r15        OPTIONAL,    - - Need ON
        nr-DL-PRS-SFN0-Offset-r16            NR-DL-PRS-SFN0-Offset-r16 ,
        nr- DL-PRS-ExpectedRSTD- r16         INTEGER (- 3841 .. 3841 ) ,
        nr-DL-PRS-ExpectedRSTD-Uncertainty-r16
                                             INTEGER (0 . . 246) ,
        nr-DL-PRS-Info-r16                   NR-DL-PRS-Info-r16,
        ...,
        [[
                prs-OnlyTP-r16               ENUMERATED { true }        OPTIONAL     - - Need ON
        ]] ,
        [[
                nr-DL-PRS-ExpectedAoD- o r-AoA-r17
                                             NR-DL-PRS-ExoectedAoD-or-AoA-r17   OPTIONAL-- Need ON
        ]]
}
```

FIG. 3C

NETWORK-BASED POSITIONING IN A NON-TERRESTRIAL NETWORK

FIELD OF DISCLOSURE

The following disclosure relates to enhancements for network-based (e.g., multiple Round Trip Time-multi-RTT) positioning in a non-terrestrial network using 5G New Radio (NR) or equivalent wireless networks.

BACKGROUND

Multi-RTT location estimation is a feature in the 5G New Radio (NR) standard that allows a user equipment (UE) (e.g., user device) to estimate its position by measuring the time taken for a signal to travel from the UE to one or more base stations, each with a known location, and back to the UE. In the 5G NR system, the UE measures the Round Trip Time (RTT) of reference signals transmitted by the base stations. The RTT measurement is reported to the network, which uses the information to estimate the UE's position. However, service providers face significant technical challenges with respect to performing multi-RTT location estimation when the network is a non-terrestrial network (NTN) (e.g., network nodes or base stations mounted in satellites or other aerial vehicles).

SUMMARY OF SOME EXEMPLARY EMBODIMENTS

Therefore, there is a need for an approach for providing multi-RTT-based positioning in an NTN.

According to one exemplary embodiment, a user device (or apparatus) comprises at least one processor; and at least one memory storing instructions that, when executed by the at least one processor, cause the user device or apparatus at least to receive a downlink position reference signal from a network node of a non-terrestrial network. The user device or apparatus is also caused to determine whether the user device is in either line-of-sight or non-line-of-sight with respect to a network node of a non-terrestrial network. The user device or apparatus is further caused to perform at least one of: (a) based on determining that the user device is in line-of-sight, transmitting a sounding reference signal for positioning to the network node; and (b) based on determining that the user device is in non-line-of-sight, transmitting the sounding reference signal for positioning to the network node for a number of repetitions.

According to another exemplary embodiment, a method comprises receiving a downlink position reference signal from a network node of a non-terrestrial network. The method also comprises determining whether the user device is in either line-of-sight or non-line-of-sight with respect to a network node of a non-terrestrial network. The method further comprises performing at least one of: (a) based on determining that the user device is in line-of-sight, transmitting a sounding reference signal for positioning to the network node; and (b) based on determining that the user device is in non-line-of-sight, transmitting the sounding reference signal for positioning to the network node for a number of repetitions.

According to another exemplary embodiment, non-transitory computer-readable storage medium carrying one or more sequences of one or more instructions which, when executed by one or more processors, cause an apparatus to receive a downlink position reference signal from a network node of a non-terrestrial network. The apparatus is also caused to determine whether the apparatus is in either line-of-sight or non-line-of-sight with respect to a network node of a non-terrestrial network. The apparatus is further caused to perform at least one of: (a) based on determining that the user device is in line-of-sight, transmitting a sounding reference signal for positioning to the network node; and (b) based on determining that the user device is in non-line-of-sight, transmitting the sounding reference signal for positioning to the network node for a number of repetitions.

According to another exemplary embodiment, an apparatus comprises means for receiving a downlink position reference signal from a network node of a non-terrestrial network. The apparatus also comprises means for determining whether the user device is in either line-of-sight or non-line-of-sight with respect to a network node of a non-terrestrial network. The apparatus further comprises means for performing at least one of: (a) based on determining that the user device is in line-of-sight, transmitting a sounding reference signal for positioning to the network node; and (b) based on determining that the user device is in non-line-of-sight, transmitting the sounding reference signal for positioning to the network node for a number of repetitions.

The means of the various exemplary embodiments described herein can be implemented in hardware and/or software. They may comprise for instance at least one processor for executing processor instructions for performing the required functions, at least one memory storing the instructions, or both. Alternatively, they could comprise for instance circuitry that is designed or configured to implement the described functions, for instance implemented in a chipset or a chip, like an integrated circuit. In general, the means may comprise for instance one or more processing means or processors.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

According to another exemplary embodiment, a system is disclosed, e.g., the system comprising at least one mobile entity and at least one network entity together performing the method according to at least one of the methods of the various exemplary embodiments. For instance, a system comprising a user device/apparatus (e.g., mobile entity, terminal device, or any equivalent user equipment) and network node (e.g., a gNB or equivalent base station) comprising:

- means for receiving a downlink position reference signal from a network node of a non-terrestrial network;
- means for determining whether the user device is in either line-of-sight or non-line-of-sight with respect to a network node of a non-terrestrial network; and
- means for performing at least one of: (a) based on determining that the user device is in line-of-sight, transmitting a sounding reference signal for positioning to the network node; and (b) based on determining that the user device is in non-line-of-sight, transmitting the sounding reference signal for positioning to the network node for a number of repetitions.

The system may comprise, e.g., the apparatus (e.g., mobile entity and/or network entity) of any exemplary aspect as disclosed herewith.

According to a further exemplary aspect, an apparatus, e.g., a mobile and/or network entity, is disclosed, configured to perform and/or control or comprising respective means for performing and/or controlling the method according to any exemplary aspect. According to a further exemplary aspect, an apparatus, e.g., a mobile and/or network entity, is disclosed comprising at least one processor; and at least one memory storing instructions that, when executed by the at least one processor, cause the apparatus at least to perform the method according to any exemplary aspect.

According to a further exemplary aspect, a computer program product is disclosed, the computer program product when executed by a processor of an apparatus causing said apparatus to perform a method according to at least one of the third and fourth exemplary aspect.

According to a further exemplary aspect, a computer readable storage medium is disclosed, the computer readable storage medium comprising a computer program product or a computer program according to the fifth exemplary aspect.

Any disclosure herein relating to any exemplary aspect is to be understood to be equally disclosed with respect to any subject-matter according to the respective exemplary aspect, e.g., relating to an apparatus, a method, a computer program, and a computer-readable medium. Thus, for instance, the disclosure of a method step shall also be considered as a disclosure of means for performing and/or caused to perform the respective method step. Likewise, the disclosure of means for performing and/or causing to perform a method step shall also be considered as a disclosure of the method step itself. The same holds for any passage describing at least one processor; and at least one memory including instructions; the at least one memory and the instructions configured to, with the at least one processor, cause an apparatus at least to perform a step.

According to an exemplary embodiment, the determining of whether the user device is in either line-of-sight or non-line-of-sight is based comparing a power of the downlink position reference signal to a threshold.

According to another exemplary embodiment, the user device or apparatus is further configured to perform based on determining that the user device is in non-line-sight, decreasing the threshold after a period of time. The user device or apparatus is further configured to perform re-determining whether the user device is in either line-of-sight or non-line-of-sight based on the decreased threshold.

According to another exemplary embodiment, the user device or apparatus is further configured to perform adding a waiting time between the receiving of the downlink position reference signal and the transmitting of the sounding reference signal for positioning.

According to another exemplary embodiment, the user device is configured with one or more transmission opportunities, and the one or more transmission opportunities restrict the transmitting of the sounding reference signal for positioning such that the network node has information on one or more transmission instants on from the user device.

According to another exemplary embodiment, the number of repetitions is transmitted based on a regular pattern or an agreed pattern between the user device and the network node.

According to another exemplary embodiment, a waiting time is included until a first repetition of the number of repetitions.

According to another exemplary embodiment, the user device or apparatus is further configured to perform providing a time between the number of repetitions to the network node.

According to another exemplary embodiment, the user device or apparatus is further configured to perform providing an identifier per repetition of the number of repetitions to the network node.

It is to be understood that the presentation in this section is merely by way of examples and non-limiting.

Other features will become apparent from the following detailed description considered in conjunction with the accompanying drawings. It is to be understood, however, that the drawings are designed solely for purposes of illustration and not as a definition of the limits, for which reference should be made to the appended claims. It should be further understood that the drawings are not drawn to scale and that they are merely intended to conceptually illustrate the structures and procedures described herein.

BRIEF DESCRIPTION OF THE DRAWINGS

The example embodiments of the invention are illustrated by way of examples, and not by way of limitation, in the figures of the accompanying drawings:

FIG. 2 is a diagram of an example multi-RTT positioning method in 5G NR, according to one exemplary embodiment;

FIGS. 3A-3C are diagrams of example assistance information for network-based positioning, according to one exemplary embodiment;

DETAILED DESCRIPTION OF SOME EXEMPLARY EMBODIMENTS

The following description serves to deepen the understanding and shall be understood to complement and be read together with the description as provided in the above summary section of this specification. Some aspects may have a different terminology than, e.g., provided in the description above. The skilled person will nevertheless understand that those terms refer to the same subject-matter, e.g., by being more specific.

Figure 1:
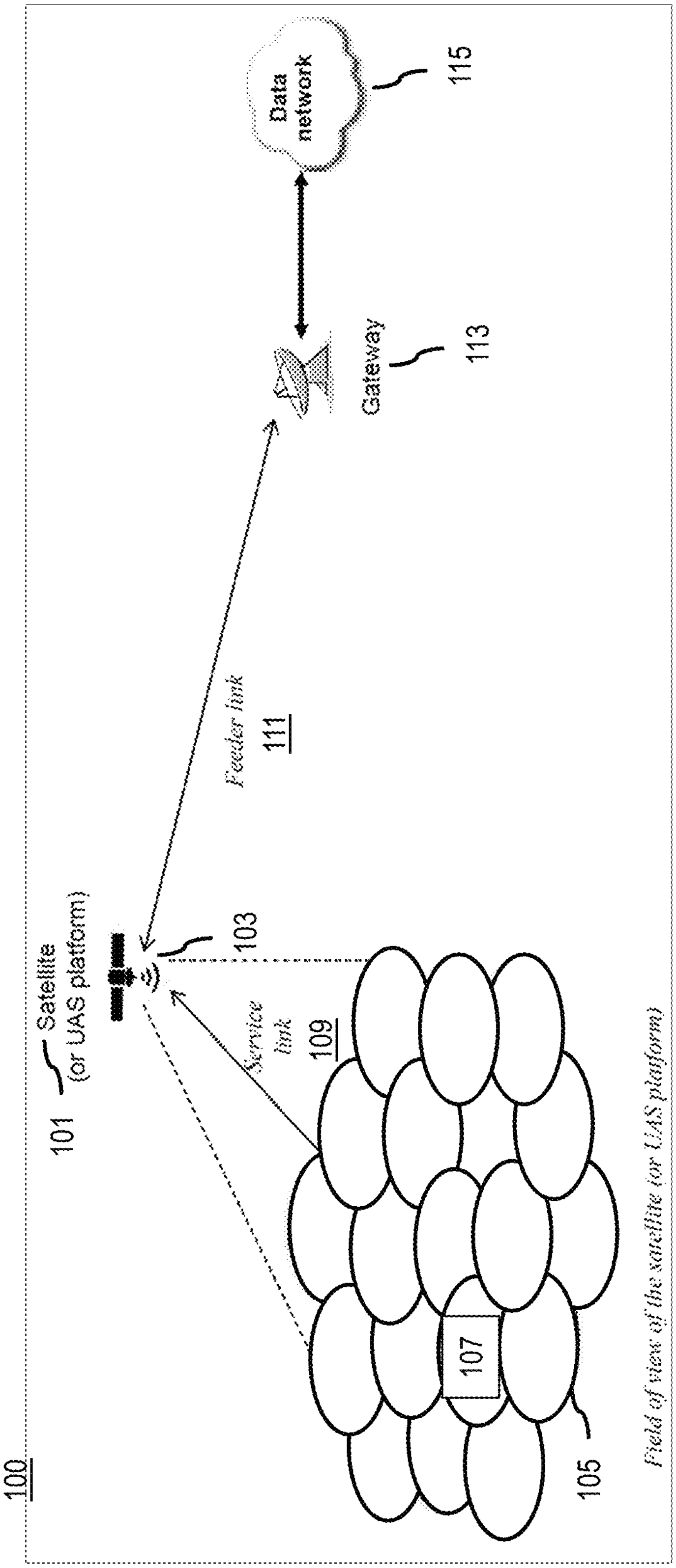
FIG. 1 is a diagram of a system capable of providing network-based positioning in a non-terrestrial network, according to one exemplary embodiment.

FIG. 1 is a diagram of a system 100 capable of providing network-based positioning in a non-terrestrial network, according to one exemplary embodiment. The feasibility of using 5G NR standards to support non-terrestrial networks has been studied during 3GPP releases 15 and 16. By way of example, A 5G NR non-terrestrial network (NTN) is a 5G wireless network that is deployed in non-terrestrial environments, such as satellites or high-altitude platforms (HAPs). These networks are designed to provide high-speed, low-latency, and reliable connectivity to users in remote, rural, or inaccessible areas, as well as for critical applications such as emergency response, disaster relief, or military operations. Compared to traditional terrestrial networks, 5G NR NTN has several advantages, such as wider coverage, higher capacity, and lower latency.

As shown in FIG. 1, the 5G NR NTN typically consists of one or more interconnected satellites 101 or HAPs, which act as base stations (e.g., gNBs 103) to provide coverage to a wide area 105. A user equipment (UE) device 107 communicates with the gNBs 103 through an air interface (e.g., via service link 109), which uses a protocol stack based on the 5G NR standard. The 5G NR NTN also includes a network management system, which coordinates the communication between the gNBs 103 and manages the allocation of resources to the UEs 107. The gNBs 103 are connected via a feeder link 111 to a gateway 113 to data network 115 (e.g., a communication network or component thereof). It is noted that although FIG. 1 provides an example with respect to a regenerative architecture where the gNB 103 is located on the satellite 101, it is contemplated that the various exemplary embodiments described herein are also applicable to a transparent architecture (e.g., specified in 5G from 3GPP Release 17 and Release 18 for NTN) where the gNB 103 is on the ground.

As used herein, the term "communication network" refers to a network (e.g., NTN) following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device (e.g., UE 107 or any equivalent mobile entity) and a network device (e.g., gNB 103 or any equivalent network entity) in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

In December 2019, 3GPP RAN plenary meeting approved the normative specification work item for NTN in release 17. In the work item, the UEs 107 supporting NTN are assumed to have Global Navigation Satellite System (GNSS) capability. In Rel-18 the topic of network verified UE location was introduced with the goal of the network being able to verify that the UE 107 was at the location it is claiming to be with a certain accuracy, see e.g., RP-223552. It appears that multi-RTT is the primary method to be studied and multiple satellites 101 may be used but single satellite 101 is higher priority. Note that the use of multiple satellites 101 likely will provide extra information which will speed up the estimation process and at the same time increase the accuracy of the estimated UE location. For NTN this would most likely be enhanced such that RTT can be measured by the same gNB 103 (e.g., satellite 101 or other aerial vehicle) at different points in time such that the satellite 101's movement over time will create measurement samples where the satellite 101's new position at different observation times will create different "location samples" during the satellite fly-over. If multiple satellites 101 are available multiple satellites 101 can be measured and potentially "sampled" as a function of time to enhance the accuracy of the estimate and to reduce the UE location estimation process.

In one exemplary embodiment, the role of the UE 107 in multi-RTT for the NTN case is as follows:

- The UE 107 receives configuration information from the Location Management Function (LMF) and serving gNB 103 on the configurations for the positioning Downlink Position Reference Signal (DL-PRS) measurements and uplink Sounding Reference Signal for positioning (UL-SRS) configuration.
- The UE 107 measures the downlink signals, i.e., DL-PRS, sent by the gNB 103, while in the uplink, the UE 107 replies with SRS signals that will be measured by the gNB 103.
- The UE 107 reports to the LMF, the DL-PRS measurements plus other associated assistance information, which allows the LMF to determine the RTTs and subsequently be able to estimate the UE 107's location.

In various exemplary embodiments, the system 100 is about NTN RTT methods including repetitions. This relates, for instance, to the 3GPP NTN rel18+ discussions (scope: UE capable of NTN in Release 18).

FIG. 2 is a diagram of an example 200 of multi-RTT positioning method in 5G NR, according to one exemplary embodiment. By way of example, the way multi-RTT works is shown in FIG. 2 for terrestrial networks. As shown, multi-RTT is a timing based positioning technique involving both downlink (DL) and uplink (UL) signals and measurements. This process includes, for instance:

1. gNB transmits DL PRS
2. UE transmits SRS for positioning (SRS-P)
3. UE measures UE Rx-Tx time difference per gNB
4. UE reports UE Rx-Tx measurements to LMF
5. Each gNB measure gNB Rx-Tx time difference
6. gNB reports gNB Rx-Tx measurement to ML
7. LMF estimates RTT to gNBs
8. LMF estimates UE positioning According to one exemplary embodiment, as described above, for NTN the terrestrial multi-RTT process illustrated above can be enhanced such that RTT can be measured by the same gNB 103 (e.g., on a satellite 101) at different points in time such that the satellites movement over time will create measurement samples where the satellite's new position at different observation times will create different "location samples" during the satellite fly-over (e.g., as opposed to multiple gNBs providing location samples). If multiple satellites 101 are available multiple satellites 101 can be measured and potentially "sampled" as a function of time to enhance the accuracy of the estimate and to reduce the UE location estimation process.

In one exemplary embodiment, configuration information is exchanged between the UE 107 and gNB 103 and/or LMF using standards-based assistance information. FIGS. 3A-3C are diagrams of example assistance information for network-based positioning, according to one exemplary embodiment. For example, as shown in FIG. 3A, the ProvideAssistanceData message body 300 in an LPP message is used by the location server, i.e., LMF, to provide assistance data to the target device either in response to a request from the target device or in an unsolicited manner. According to one exemplary embodiment, the field 301 is added for nr-Multi-RTT-ProvideAssistanceData-r16 to contain multi-RTT information.

FIG. 3B illustrates the contents of the nr-Multi-RTT-ProvideAssistanceData-r16 field 301, according to one exemplary embodiment. The example 320 of FIG. 3C and Table 1 below provides more detailed field descriptions.

TABLE 1

| NR-Multi-RTT-ProvideAssistanceData field descriptions |
|---|
| nr-DL-PRS-AssistanceData<br>This field specifies the assistance data reference and neighbor TRPs and provides the DL-PRS configuration for the TRPs.<br>Note, if this field is absent but the nr-SelectedDL-PRS-IndexList field is present, the nr-DL-PRS-AssistanceData may be provided in IE NR-DL-TDOA-ProvideAssistanceData or NR-DL-AoD-ProvideAssistanceData. |
| nr-SelectedDL-PRS-IndexList<br>This field specifies the DL-PRS Resources which are applicable for this NR-Multi-RTT-ProvideAssistanceData message. |
| nr-Multi-RTT-Error<br>This field provides Multi-RTT error reasons. |
| nr-On-Demand-DL-PRS-Configurations<br>This field provides a set of available DL-PRS configurations which can be requested by the target device on-demand.<br>NOTE 1: Void.<br>NOTE 2: If this field is absent but the nr-On-Demand-DL-PRS-Configurations-Selected-IndexList is present, the nrOn-Demand-DL-PRS-Configurations may be provided in IE NR-DL-AoD-ProvideAssistanceData or NR-DLTDOA-ProvideAssistanceData. |
| nr-On-Demand-DL-PRS-Configurations-Selected-IndexList<br>This field specifies the selected available on-demand DL-PRS configurations which are applicable for this NR-MultiRTT-ProvideAssistanceData message. |
| assistanceDataValidityArea<br>This field specifies the network area for which this NR-Multi-RTT-ProvideAssistanceData is valid. |

In NTN the network transmission and reception points (i.e., the gNBs 103 of satellites 101) for traditional multi-RTT location estimation are far away, leading to a poor link budget, where the uplink is the weakest link. This may hinder proper reception, especially if the UE 107 is not in line-of-sight (LOS) with the reception point, but covered by building, terrain, foliage, indoor, etc.

As a result, the multi-RTT location estimation process for NTN needs to work with measurements from, at least, a single satellite 101 over time to create the "location samples." The duration of the multi-RTT location verification is an important factor since it should be completed before a determined period. A long period of location verification is undesired because it could interfere with UE power consumption, and would allow a UE 107 that was not at an allowed location to obtain service from the Public Land Mobile Network (PLMN) that might violate regulatory requirements. For these reasons, the RTT measurements are likely to be triggered at low elevation angles to initiate the process as soon as possible. However, at low elevation angles the likelihood of NLOS is larger and the link budget is poorest, so the likelihood of proper reception in the uplink is low. Even for high elevation angles, the UE 107 might be shadowed by surrounding objects, e.g., buildings, terrain elevations and canopy.

The various exemplary embodiments described herein address these technical challenges. More specifically, the various embodiments of the system 100 aim at maximizing the chance that the SRS-P signal from the UE 107 (e.g., an example of a terminal/user node/device or any equivalent mobile entity) is received at the satellite 101 and gNB 103 (e.g., an example of a network node/device or any equivalent network entity) by:

1. Reference Signal Received Power/Line-of-Sight (RSRP/LOS) dependency: in this case the SRS-P signal is first sent when the UE 107 is in LOS or the RSRP is higher than a certain threshold value
   - The threshold value can be decreased with time in order to ensure it is attempted at some point in time.
   - The waiting time before a signal is transmitted needs to be added to the time between Rx and TX the UE is reporting to the network.
   - The UE may be configured with a set of SRS-P "transmission opportunities" which restricts the UE's transmission opportunities such that the gNB knows the exact potential transmission instants from UE side.
2. Repetitions: The SRS-P can be repeated in order to reach the satellite 101 and gNB 103. The repetitions can come with regular patterns or in an agreed pattern.
   - As the network needs to know when the repetition which allowed the network to detect the SRS-P signal, was transmitted, the UE can do the following:
     - The UE 107 can include the waiting time until the first of the repetitions in the processing time and furthermore provides the time between the repetitions if not already known by the network.
   - As with the pre-configured transmission instants, each of the transmission opportunities may be used as reference time for the calculation of the UE perceived "processing time" (including the UE's understanding of the applied timing advance.

As used herein, the term "network node/device" refers to a node in a communication network via which a terminal device (e.g., UE 107, mobile entity, terminal device, or any equivalent user equipment) accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

Figure 4:
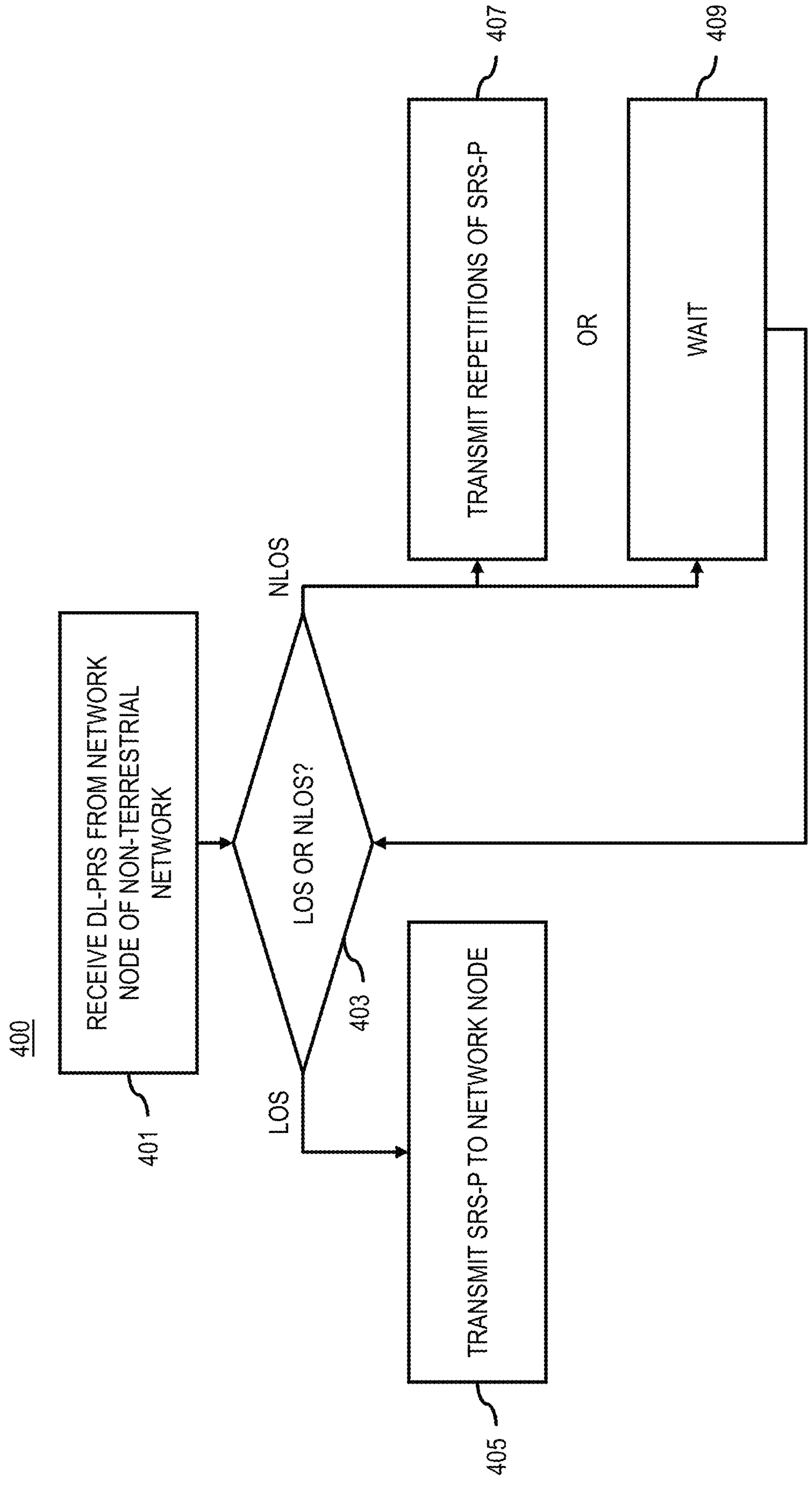
FIG. 4 is a flowchart of a process for providing network-based positioning in a non-terrestrial network, according to one exemplary embodiment.
Figure 7:
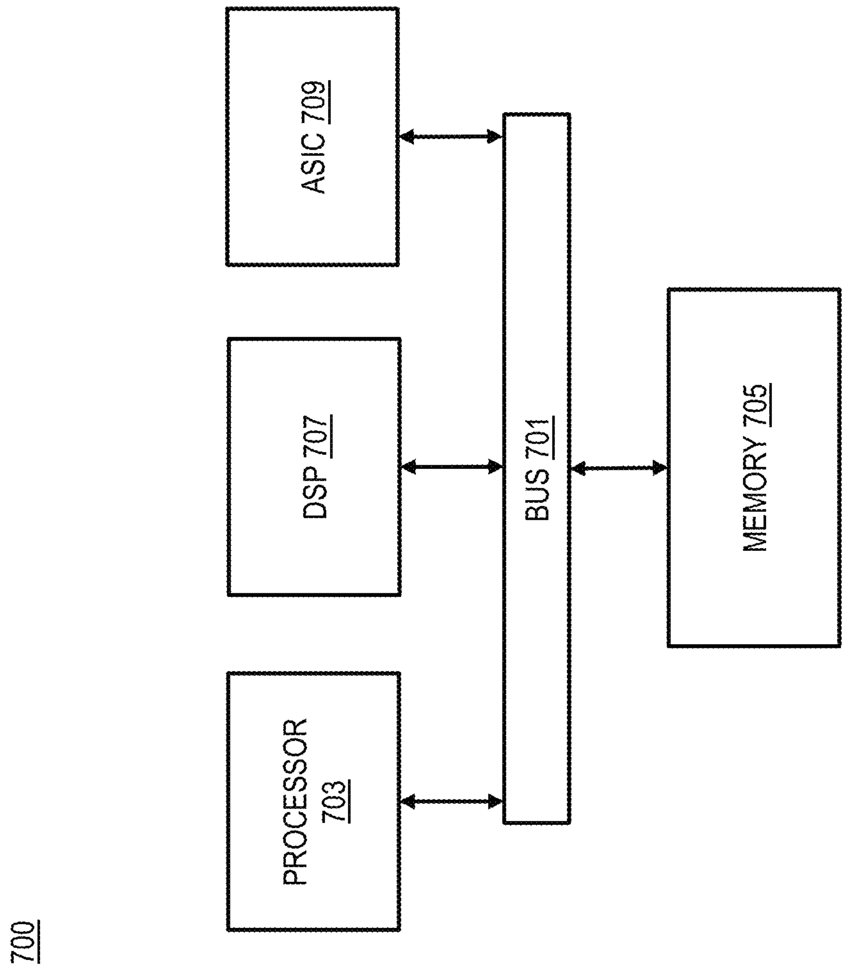
FIG. 7 is a diagram of a chip set that can be used to implement an exemplary embodiment.

In addition, the term "terminal/user node/device" refers to any end device (e.g., UE 107) that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, FIG. 4 is a flowchart of a process for providing network-based positioning in a non-terrestrial network, according to one exemplary embodiment. In various embodiments, the UE 107 alone or in combination with the gNB 103 and/or LMF may perform one or more portions of the process 400 and may be implemented in, for instance, a chip set including a processor and a memory as shown in FIG. 7. As such, the UE 107 alone or in combination with the gNB 103 and/or LMF can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In step 401, the UE 107 receives a downlink position reference signal (DL-PRS) from a network node (e.g., gNB 103) of a non-terrestrial network.

In step 403, the UE 107 determines whether the user device (e.g., UE 107) is in either line-of-sight (LOS) or non-line-of-sight (NLOS) with respect to a network node (e.g., gNB 103) of a non-terrestrial network. In one exemplary embodiment, the determining of whether the user device is in either line-of-sight or non-line-of-sight is based comparing a power of the downlink position reference signal (e.g., RSRP of the DL-PRS) to a threshold (e.g., any designated power level threshold).

In step 405, based on determining that the user device (e.g., UE 107) is in line-of-sight (LOS), the UE 107 performs transmitting a sounding reference signal for positioning (SRS-P) to the network node (e.g., gNB 103).

In one exemplary embodiment, the user device (UE 107) is configured with one or more transmission opportunities. By way of example, the one or more transmission opportunities restrict the transmitting of the sounding reference signal for positioning (SRS-P) such that the network node (e.g., gNB 103) has information on one or more transmission instants on from the user device (e.g., UE 107).

In step 407, based on determining that the user device (e.g., UE 107) is in non-line-of-sight (NLOS), the UE 107 performs transmitting the sounding reference signal for positioning (SRS-P) to the network node (e.g., gNB 103) for a number of repetitions (e.g., any designated number of repetitions). In one exemplary embodiment, the number of repetitions is transmitted based on a regular pattern or an agreed pattern between the user device (e.g., UE 107) and the network node (e.g., gNB 103). In another exemplary embodiment, a waiting time is included until a first repetition of the number of repetitions. The UE 107 can also provide a time between the number of repetitions to the network node (e.g., gNB 103) and/or provide an identifier per repetition of the number of repetitions to the network node (e.g., gNB 103).

Alternatively, in one exemplary embodiment, at step 409, the UE 107 can add a waiting time (e.g., any designated period of time) between the receiving of the downlink position reference signal (DL-PRS) and the transmitting of the sounding reference signal for positioning (SRS-P) when the UE 107 is in non-line-of-sight (NLOS), and optionally provide this waiting time to the network node. Then after the waiting time, the UE 107 returns to step 403 to re-determine whether the UE 107 is in LOS or NLOS. The waiting time, for instance, is applied to address the possibility that conditions may change (e.g., movement of the UE 107 and satellite 101/gNB 103, removal of signal blockage, etc. during the waiting time) such that the UE 107 would be in LOS. If after the waiting period, step 403 determines the UE 107 is in LOS (e.g., based on determining that a new RSRP is greater than the threshold without changing the threshold), then the UE 107 transmits the SRS-P (step 405). In other words, the UE 107 initiates the transmitting of the SRS-P based on determining that the UE 107 is in LOS after the waiting time.

In addition or alternatively, based on determining that the user device (e.g., UE 107) is in non-line-sight, the UE 107 can decrease the threshold (e.g., for determining LOS or NLOS) after a period of time (e.g., any designated period of time). After the period of time, the UE 107 can re-determine whether the user device is in either line-of-sight (LOS) or non-line-of-sight (NLOS) based on the decreased threshold. For example, the RSRP of the current DL-PRS may now meet the decreased threshold for being classified as LOS, or conditions have changed such that a new RSRP meets the applicable threshold.

Figure 5A:
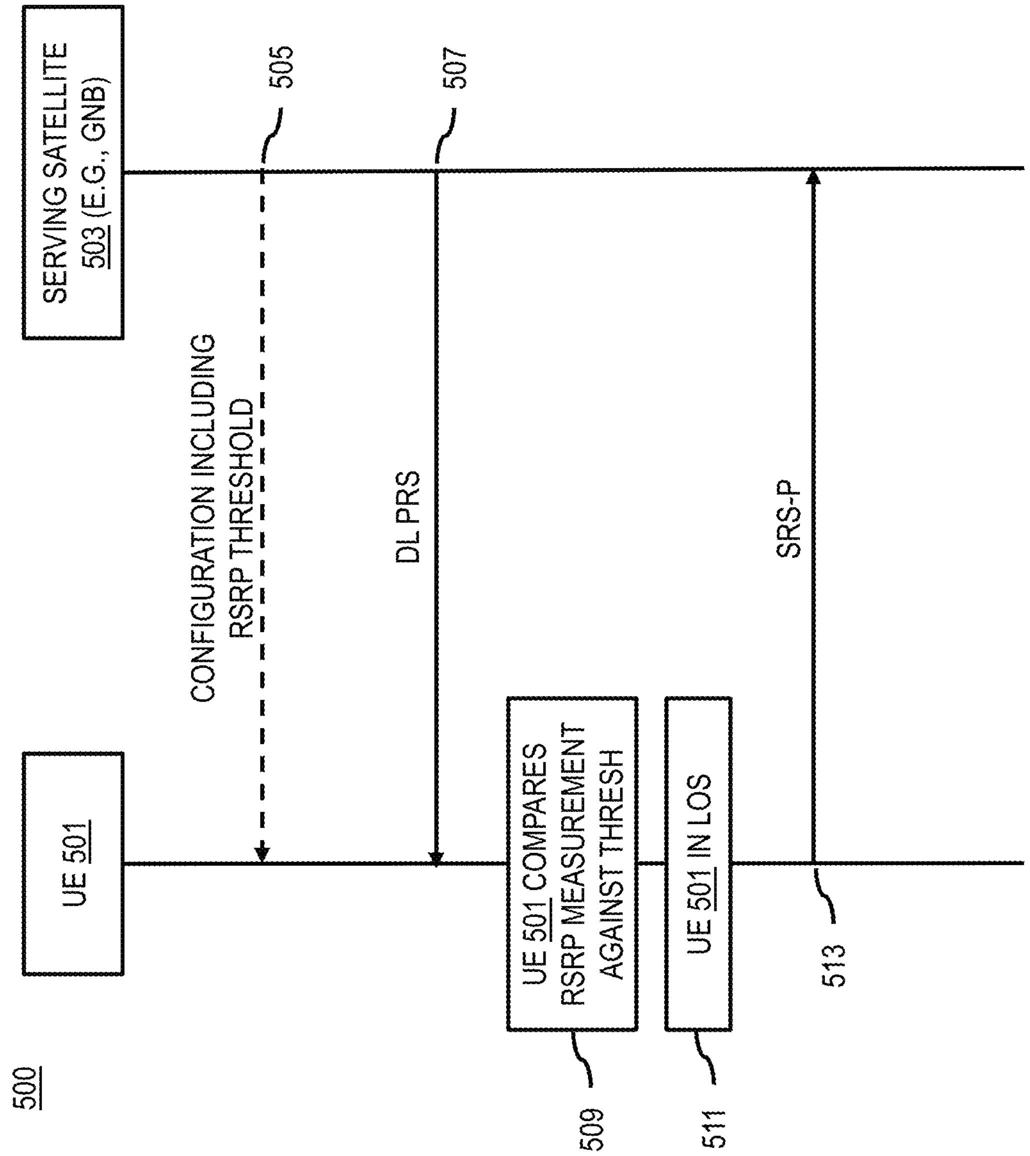
FIG. 5A is a signaling diagram of a process for LOS-based positioning in a non-terrestrial network, according to one exemplary embodiment.
Figure 5B:
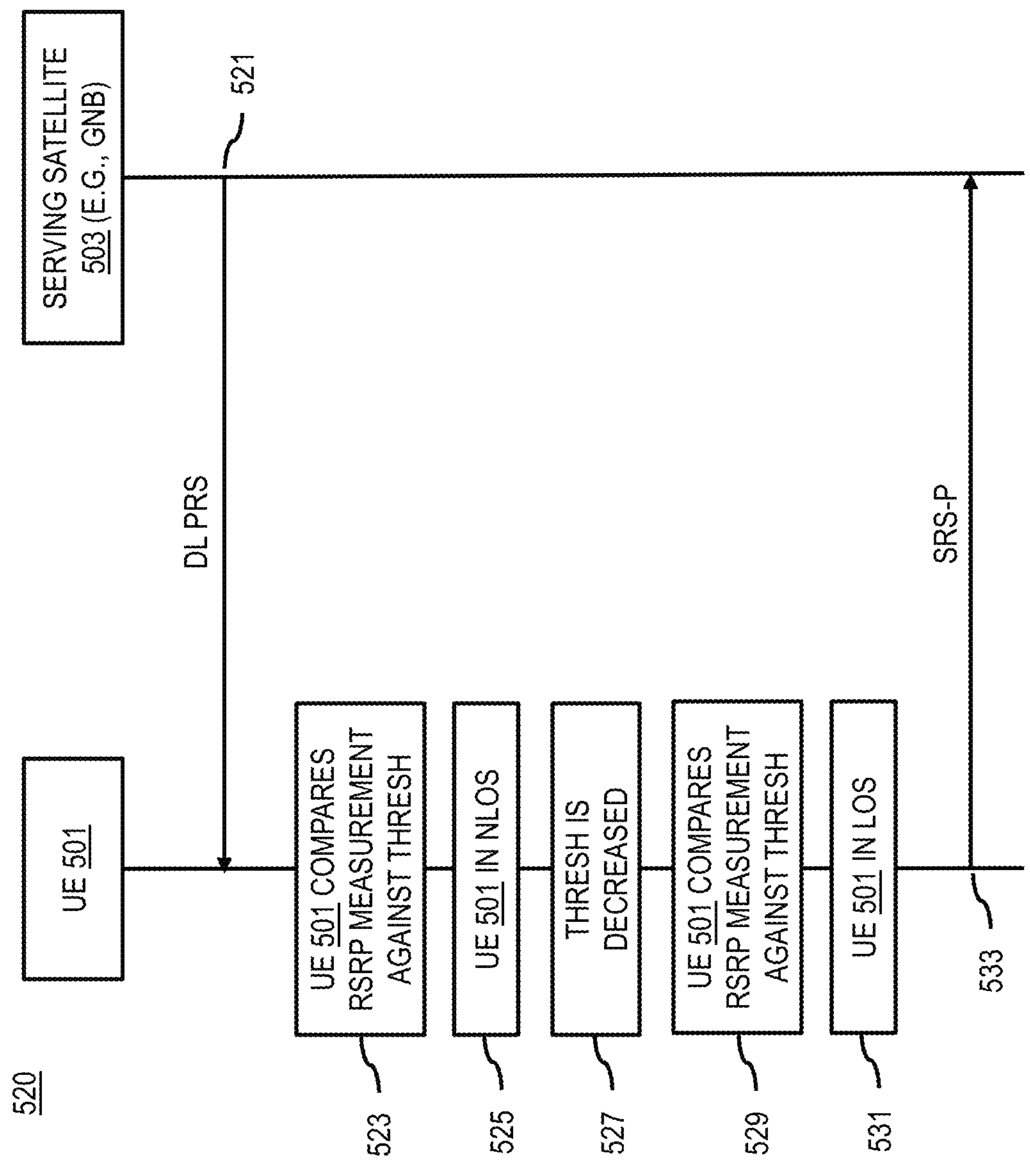
FIG. 5B is a signaling diagram of a process for changing LOS during positioning in a non-terrestrial network, according to one exemplary embodiment.
Figure 5C:
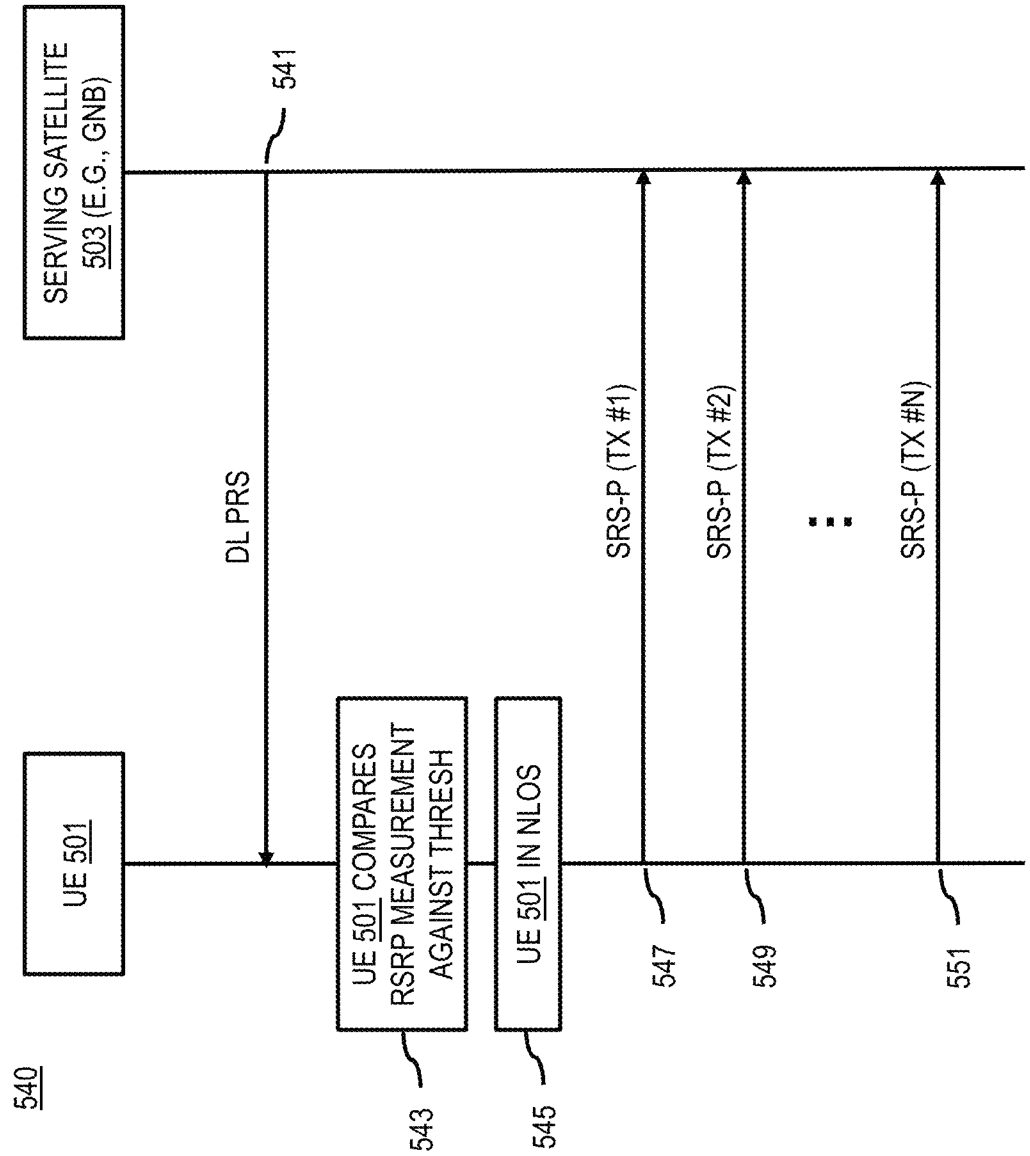
FIG. 5C is a signaling diagram of a process for NLOS-based positioning in a non-terrestrial network, according to one exemplary embodiment.

Some exemplary embodiments of different options of the process 400 are illustrated in FIGS. 5A-5C. For example, FIG. 5A is a signaling diagram of a process 500 for LOS-based positioning in a non-terrestrial network, according to one exemplary embodiment. In this signaling diagram, a UE 501 and serving satellite 503 (e.g., equipped with a gNB) are represented. The process 500 begins with a message 505 from the serving satellite 503 to the UE 501 with configuration information include the RSRP threshold that should be applied for distinguishing between LOS and NLOS. More specifically, the process 500 shows the case where the UE 501 receives the DL-PRS (step 507). At step 509, the UE 501 compares the RSRP measurement of the received DL-PRS against the RSRP threshold. At step 511, the UE 107 determines it is in LOS with the serving satellite 503 because the RSRP measurement fulfilled the RSRP threshold. Accordingly, at step 513, the UE 501 transmits the SRS-P back to the serving satellite 503 as soon as it can. The UE 501 will further report the time between reception of the DL-PRS at step 507 and transmission of SRS-P to the LMF at step 513.

In summary, under the process 500, the UE 501 performs the following:

1. UE 501 receives DL-PRS;
2. UE 501 compares RSRP measurement of the DL-PRS to the RSRP threshold;
3. UE 501 determine it is in LOS (e.g., based on comparison at item 2); and
4. UE 501 sends SRS-P.

FIG. 5B is a signaling diagram of a process 520 for changing LOS during positioning in a non-terrestrial network, according to one exemplary embodiment. In this signaling diagram, the UE 501 and serving satellite 503 (e.g., equipped with a gNB) are represented. The process 520 shows the case where the UE 501 receives the DL-PRS from the serving satellite 503 (step 521). At step 523, the UE 501 compares the RSRP measurement of the received DL-PRS against the RSRP threshold. At step 525, the UE 501 determines that it is in NLOS with the serving satellite 503 because the RSRP measurement does not fulfil the RSRP threshold to start the transmission of the SRS-P. At step 527, the threshold is eventually lowered (e.g., by a percentage, fixed amount, and/or any other specified amount), after which the threshold is fulfilled (at step 529). Based on this updated comparison, the UE 501 determines that it is now in LOS (step 531), and the SRS-P is sent by the UE 501 (at step 533). The UE 501 will report the time between reception of the DL-PRS at step 521 and transmission of the SRS-P to the LMF at step 533. Note that also without lowering the RSRP threshold, the UE 501 can send the SRS-P when the RSRP has changed so much that the initial threshold (or any subsequently lowered threshold) is fulfilled.

In summary, under the process 520, the UE 501 performs the following:

1. UE 501 receives DL-PRS;
2. UE 501 compares RSRP measurement of the DL-PRS to the RSRP threshold;
3. UE 501 determine it is in NLOS (e.g., based on comparison at item 2);
4. RSRP threshold is decreased;
5. UE 501 compares RSRP measurement of the DL-PRS to the decreased RSRP threshold;
6. UE 501 determine it is in LOS (e.g., based on comparison at item 5); and
7. UE 501 sends SRS-P.

FIG. 5C is a signaling diagram of a process 540 for NLOS-based positioning in a non-terrestrial network using repetitions, according to one exemplary embodiment. The process 540 shows the case where the UE 501 receives the DL-PRS (step 541). At step 543, the UE 501 compares the RSRP measurement of the received DL-PRS against the RSRP threshold. At step 545, the UE 107 determines it is in NLOS with the serving satellite 503 because the RSRP measurement does not fulfil the RSRP threshold. Accordingly, at steps 547-551, the UE 501 begins transmitting repetitions of the SRS-P back to the serving satellite 503. In one exemplary embodiment, the UE 501 is configured with a certain amount of repetitions, a time to be used for repetitions, a time to wait between repetitions, and/or any equivalent parameters for controlling the transmission of the repetitions. In one exemplary embodiment, the repetition parents can be coordinated with or otherwise exchanged between the UE 501 and serving satellite 503 (e.g., as part of a configuration message such as the message 505 of FIG. 5A or any equivalent configuration process).

As the UE 501 in principle does not know which repetition (e.g., steps 547-551 corresponding to Tx #1 to Tx #N) is successful, the UE 501 can report the time between receiving the DL-PRS at step 541 and the first repetition at step 547 (basically until the first transmission attempt of the SRS-P) plus the time between transmissions of the repetitions (e.g., the time between the repetition at step 547 and the repetition at step 549). Alternatively, the network and UE 501 can have agreed on the time between repetitions beforehand. In another alternative, the UE 501 provides the time between the different repetitions and an identifier per repetition is included in the SRS-P such that the count will also match if the network misses a repetition.

In summary, under the process 540, the UE 501 performs the following:

1. UE 501 receives DL-PRS;
2. UE 501 compares RSRP measurement of the DL-PRS to the RSRP threshold;
3. UE 501 determine it is in NLOS (e.g., based on comparison at item 2); and
4. UE 501 sends N repetitions of SRS-P.

The processes described herein for providing network-based positioning in a non-terrestrial network may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 6:
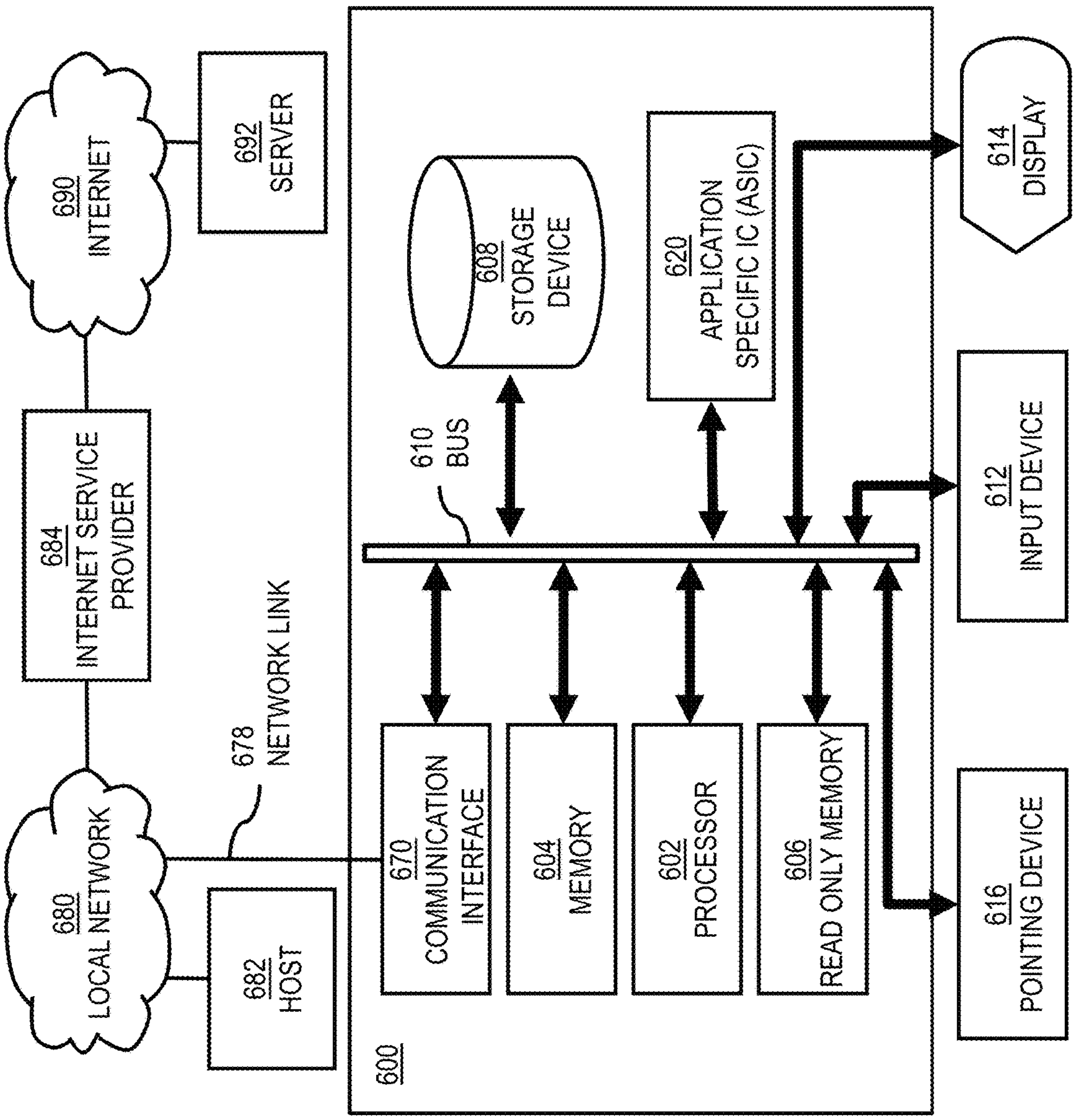
FIG. 6 is a diagram of hardware that can be used to implement an exemplary embodiment.

FIG. 6 illustrates a computer system 600 (e.g., comprising any of the mobile entity and/or network apparatuses described herein or a component thereof such as but not limited to the UE 107 or gNB 103) upon which an embodiment of the invention may be implemented. Computer system 600 is programmed (e.g., via computer program code or instructions) to provide network-based positioning in a non-terrestrial network as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to providing network-based positioning in a non-terrestrial network. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for providing network-based positioning in a non-terrestrial network. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing network-based positioning in a non-terrestrial network, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 115 for providing network-based positioning in a non-terrestrial network.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system can be deployed in various configurations within other computer systems, e.g., host 682 and server 692.

FIG. 7 illustrates a chip set 700 (e.g., comprising any of the mobile entity and/or network apparatuses described herein or a component thereof such as but not limited to the UE 107 or gNB 103) upon which an embodiment of the invention may be implemented. Chip set 700 is programmed to provide network-based positioning in a non-terrestrial network as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide network-based positioning in a non-terrestrial network. The memory 705 also stores the data associated with or generated by the execution of the inventive steps.

Figure 8:
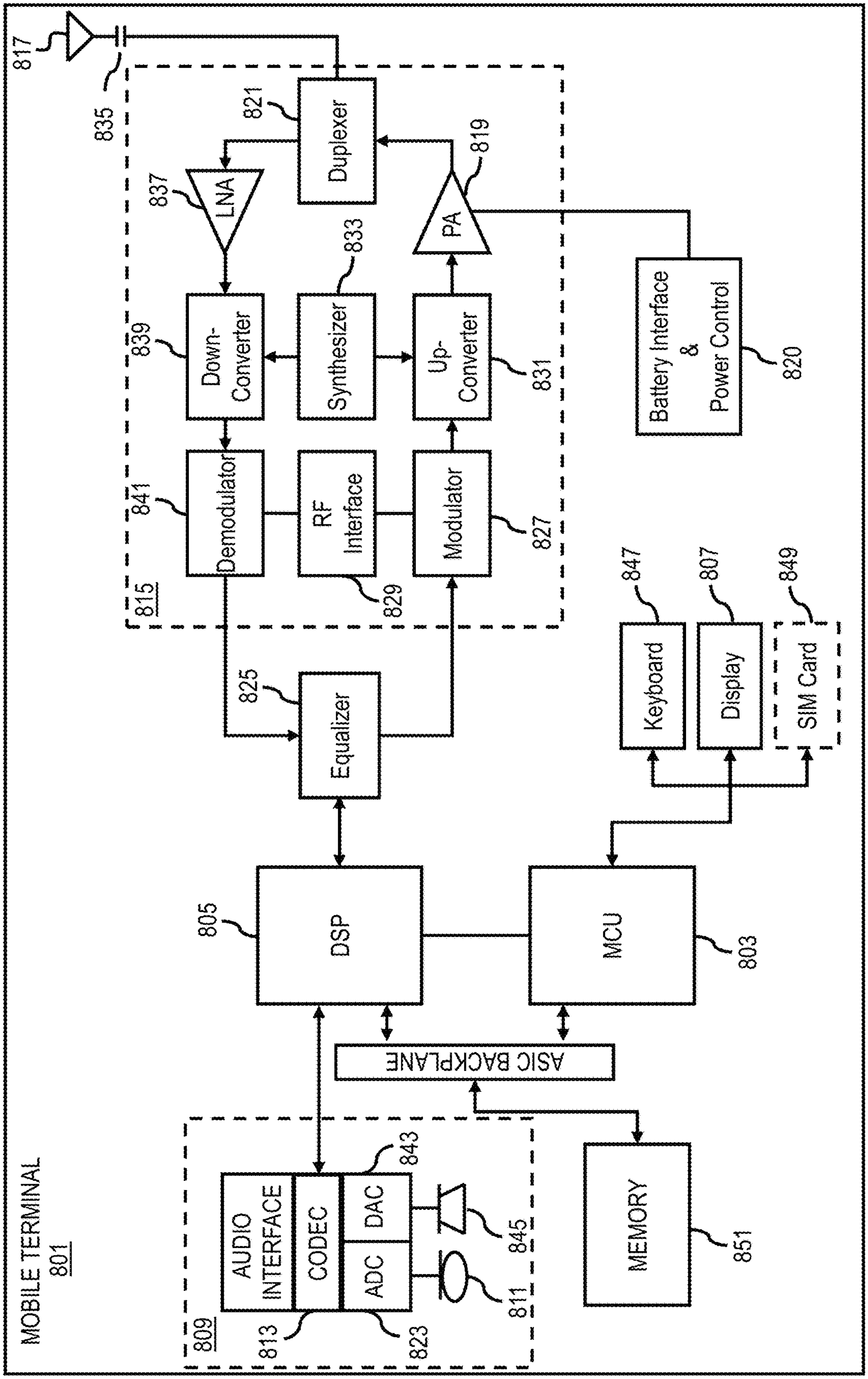
FIG. 8 is a diagram of a mobile terminal that can be used to implement an exemplary embodiment.

FIG. 8 is a diagram of exemplary components of a mobile terminal (e.g., UE 107, user device, user apparatus, terminal device, mobile entity, any equivalent user equipment, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions that offer automatic contact matching. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile station 801 to provide network-based positioning in a non-terrestrial network. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 851 may be, but not limited to, a single memory, CD, DVD, ROM, RAM, EEPROM, optical storage, or any other non-volatile or non-transitory storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICS, signal processing devices, and other devices.

The expression "A and/or B" is considered to comprise any one of the following three scenarios: (i) A, (ii) B, (iii) A and B. This expression "A and/or B" is considered to have the same meaning as "at least one of A or B", and "at least one of A and B". Furthermore, the article "a" is not to be understood as "one", i.e., use of the expression "an element" does not preclude that also further elements are present. The term "comprising" is to be understood in an open sense, i.e., in a way that an object that "comprises an element A" may also comprise further elements in addition to element A. Further, the term "comprising" may be limited to "consisting of", i.e., consisting of only the specified elements.

The expression "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

It will be understood that all presented embodiments are only exemplary, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable, and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The subject-matter has been described above by means of example embodiments. It should be noted that there are alternative ways and variations which are obvious to a skilled person in the art and can be implemented without deviating from the scope of the appended claims.

LIST OF ABBREVIATIONS

DL Downlink
gNB Next Generation NodeB
GNSS Global Navigation Satellite System
HAP High-Altitude Platform
LMF Location Management Function
LOS Line of Sight
NLOS Non-Line of Sight
NTN Non-Terrestrial Networks
PRS Position Reference Signals
RSRP Reference Signal Received Power
RTT Round Trip Time
Rx Receiver/Receive/Reception
SRS-P Sounding Reference Signal for Positioning
Tx Transmitter/Transmit/Transmission
UE User Equipment
UL Uplink

What is claimed is:

1. A user device comprising:

at least one processor; and at least one memory storing instructions that, when executed with the at least one processor, cause the user device at least to perform:

receiving a downlink position reference signal from a network node of a non-terrestrial network;

determining whether the user device is in either line-of-sight or non-line-of-sight with respect to the network node of the non-terrestrial network; and performing at least one of:

based on determining that the user device is in line-of-sight, transmitting a sounding reference signal for positioning to the network node; or based on determining that the user device is in non-line-of-sight, transmitting the sounding reference signal for positioning to the network node for a number of repetitions, wherein a waiting time is included until a first repetition of the number of repetitions.

2. The user device of claim 1, wherein the determining of whether the user device is in either line-of-sight or non-line-of-sight is based on comparing a power of the downlink position reference signal, a reference signal received power of a cell, or a combination thereof to a threshold.

3. The user device of claim 2, wherein the user device is caused to further perform:

based on determining that the user device is in non-line-sight, decreasing the threshold after a period of time; and re-determining whether the user device is in either line-of-sight or non-line-of-sight based on the decreased threshold.

4. The user device of claim 1, wherein the user device is caused to further perform:

based on determining that the user device is in non-line-of-sight, adding the waiting time between the receiving of the downlink position reference signal and the transmitting of the sounding reference signal for positioning; and initiating the transmitting of the sounding reference signal for positioning based on determining that the user device is in line-of-sight after the waiting time.

5. The user device of claim 1, wherein the user device is configured with one or more transmission opportunities.

6. The user device of claim 5, wherein the one or more transmission opportunities are configured to restrict the transmitting of the sounding reference signal for positioning, wherein the restriction is configured to indicate one or more transmission instants of the user device.

7. The user device of claim 1, wherein the number of repetitions is transmitted based on a regular pattern or an agreed pattern between the user device and the network node.

8. The user device of claim 1, wherein the user device is configured to further perform:

providing a time between the number of repetitions, the waiting time before the transmitting of the sounding reference signal for positioning, or a combination to the network node.

9. The user device of claim 1, wherein the user device is configured to further perform:

providing an identifier per repetition of the number of repetitions to the network node.

10. A method comprising:

receiving a downlink position reference signal from a network node of a non-terrestrial network;

determining whether a user device is in either line-of-sight or non-line-of-sight with respect to the network node of the non-terrestrial network; and performing at least one of:

based on determining that the user device is in line-of-sight, transmitting a sounding reference signal for positioning to the network node; or based on determining that the user device is in non-line-of-sight, transmitting the sounding reference signal for positioning to the network node for a number of repetitions, wherein a waiting time is included until a first repetition of the number of repetitions.

11. The method of claim 10, wherein the determining of whether the user device is in either line-of-sight or non-line-of-sight is based on comparing a power of the downlink position reference signal, a reference signal received power of a cell, or a combination thereof to a threshold.

12. The method of claim 11, further comprising:

based on determining that the user device is in non-line-sight, decreasing the threshold after a period of time; and re-determining whether the user device is in either line-of-sight or non-line-of-sight based on the decreased threshold.

13. The method of claim 10, further comprising:

based on determining that the user device is in non-line-of-sight, adding the waiting time between the receiving of the downlink position reference signal and the transmitting of the sounding reference signal for positioning.

14. The method of claim 10, wherein the number of repetitions is transmitted based on a regular pattern or an agreed pattern between the user device and the network node.

15. A non-transitory computer-readable medium storing instructions thereon for performing at least the following:

receiving a downlink position reference signal from a network node of a non-terrestrial network;

determining whether a user device is in either line-of-sight or non-line-of-sight with respect to the network node of the non-terrestrial network; and performing at least one of:

based on determining that the user device is in line-of-sight, transmitting a sounding reference signal for positioning to the network node; or based on determining that the user device is in non-line-of-sight, transmitting the sounding reference signal for positioning to the network node for a number of repetitions, wherein a waiting time is included until a first repetition of the number of repetitions.

16. The non-transitory computer-readable medium of claim 15, wherein the determining of whether the user device is in either line-of-sight or non-line-of-sight is based on comparing a power of the downlink position reference signal, a reference signal received power of a cell, or a combination thereof to a threshold.

17. The non-transitory computer-readable medium of claim 16, wherein the instructions are further for performing:

based on determining that the user device is in non-line-sight, decreasing the threshold after a period of time; and re-determining whether the user device is in either line-of-sight or non-line-of-sight based on the decreased threshold.

18. The non-transitory computer-readable medium of claim 15, wherein the instructions are further for performing:

based on determining that the user device is in non-line-of-sight, adding the waiting time between the receiving of the downlink position reference signal and the transmitting of the sounding reference signal for positioning.

19. The non-transitory computer-readable medium of claim 15, wherein the number of repetitions is transmitted based on a regular pattern or an agreed pattern between the user device and the network node.

* * * * *